United States Patent [19]
Chadwick

[11] Patent Number: 5,884,952
[45] Date of Patent: Mar. 23, 1999

[54] GRIPPER DEVICE

[75] Inventor: Barry Ian Chadwick, Cambridge, Canada

[73] Assignee: Rubberline Products Ltd, Ontario, Canada

[21] Appl. No.: 867,123

[22] Filed: Jun. 2, 1997

[51] Int. Cl.⁶ .................................................. B25J 15/08
[52] U.S. Cl. .......................................... 294/88; 294/115
[58] Field of Search ............................. 294/88, 97, 106, 294/115, 116; 269/32, 34, 228; 901/31, 32, 36–39

[56] References Cited

U.S. PATENT DOCUMENTS

| | | |
|---|---|---|
| 2,800,355 | 7/1957 | Vinner et al. ............................. 294/88 |
| 3,512,824 | 5/1970 | Bautz et al. ............................. 294/115 |
| 3,945,676 | 3/1976 | Asamoto . |
| 4,185,866 | 1/1980 | Wittwer . |
| 4,234,223 | 11/1980 | O'Neil . |
| 4,304,433 | 12/1981 | Langowski . |
| 4,566,727 | 1/1986 | Yuda . |
| 4,728,137 | 3/1988 | Hamed et al. ............................ 294/88 |
| 5,072,652 | 12/1991 | Blatt ...................................... 294/88 X |

Primary Examiner—Johnny D. Cherry
Attorney, Agent, or Firm—Ryan Kromholz & Manion

[57] ABSTRACT

A gripper device is provided for gripping and releasing objects. The device incorporates two gripper fingers which are opened and closed in response to the movement of a piston rod. The gripper fingers move from the open to the closed position as the piston rod moves from the retracted to the extended position. The gripper fingers are connected to a connector block by chain links which act as a toggle. When in the closed position, the gripper fingers are locked and can only be unlocked by a retraction of the piston rod with sufficient force to overcome the over-centre toggle arrangement of the chain links.

4 Claims, 2 Drawing Sheets 5,884,952

1

GRIPPER DEVICE

FIELD OF THE INVENTION

The invention relates to a gripper device for use in industrial applications.

BACKGROUND OF THE INVENTION

Grippers used in industrial applications typically include a pneumatically or hydraulically controlled piston which is indirectly connected to gripper fingers. It is well known to construct such grippers so that when the piston is moved towards the gripper fingers, the gripper fingers open. To close the gripper fingers in such grippers, the piston must be moved in a direction away from the fingers. Examples of such grippers are shown in U.S. Pat. No. 4,185,866 which issued to Wittwer in 1980; U.S. Pat. No. 4,304,433 which issued to Langowski in 1981; U.S. Pat. No. 4,566,727 which issued to Yuda in 1986 and U.S. Pat. No. 4,234,223 which issued to O'Neil in 1980. The devices described in the Yuda and O'Neil patents have a drawback in that when the gripper fingers are in the closed position, with a loss of pressure, the fingers will not necessarily remain locked in the closed position. Furthermore, all four patents describe complicated gripper devices requiring many interconnected parts.

U.S. Pat. No. 3,945,676 which issued to Asamoto in 1976 discloses a gripper device in which the gripper fingers close as the piston moves towards the fingers and the fingers open when the piston moves away from the fingers. However, similar to the devices described in the Yuda and O'Neil patents, it appears that the gripper fingers do not lock in the closed position if the gripper experiences a loss of pressure.

SUMMARY OF THE INVENTION

It is an object of the present invention to obviate or mitigate the above identified disadvantages.

According to a first broad aspect, the invention provides a device for gripping objects for use in assembly lines and similar applications, the device comprising: a housing; two gripper fingers, wherein in operation the fingers are adapted to move to a closed position to grip an object and an open position to release an object, each gripper finger including a generally forwardly extending finger element, a hook portion projecting generally perpendicularly from near a rear portion of the finger element, and a third portion projecting generally rearwardly from near an end portion of the hook portion wherein the third portion is oriented generally parallel to the finger element and wherein each gripper finger, near a curved portion of the gripper finger, is pivotally connected to said housing; a piston rod including a connector block at one end, said piston rod being movable from a retracted position to an extended position; a connecting means for attaching the gripper fingers to the connector block; wherein as the piston rod moves from the retracted position to the extended position, the gripper fingers move from the open position to the closed position; and wherein, when the gripper fingers are in the closed position, the connecting means are adapted to lock the gripper fingers in the closed position until a sufficient force is exerted to move the piston rod towards the retracted position.

Advantages include a gripper device in which the gripper fingers move towards the closed position as the piston moves towards the fingers and, if the gripper device experiences a loss of pressure when the fingers are in the closed position, the fingers remain locked in the closed position.

BRIEF DESCRIPTION OF THE DRAWINGS

Preferred embodiments of the invention will now be described with reference to the attached drawings wherein:

2

Figure 1A:
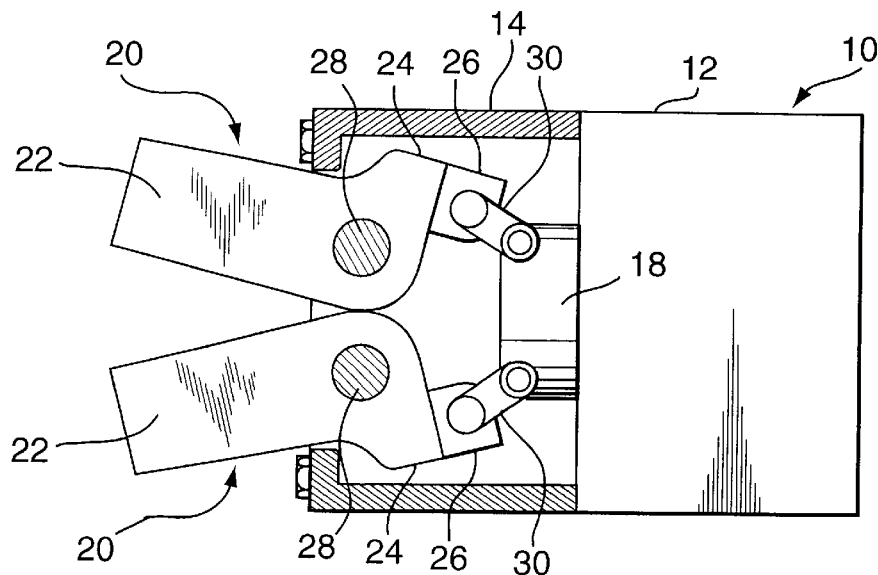
Figure 1B:
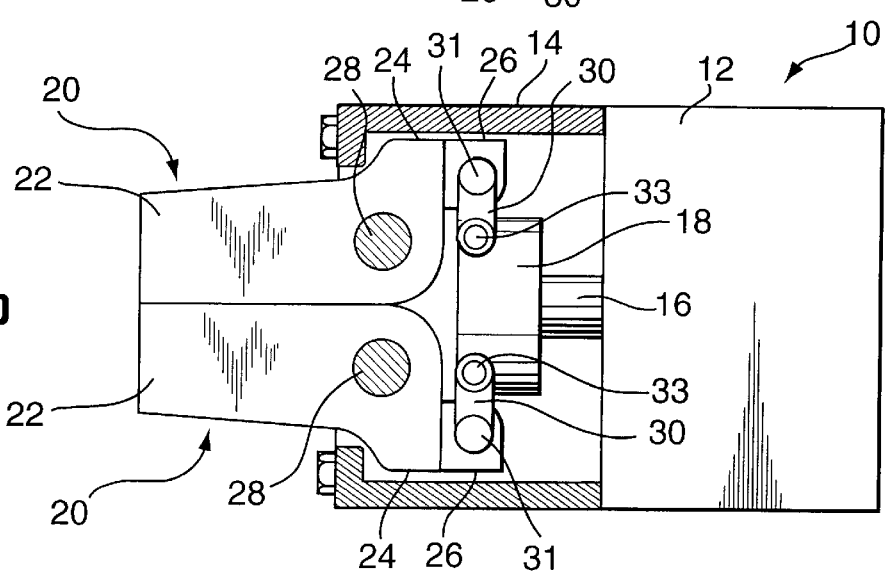
Figure 1C:
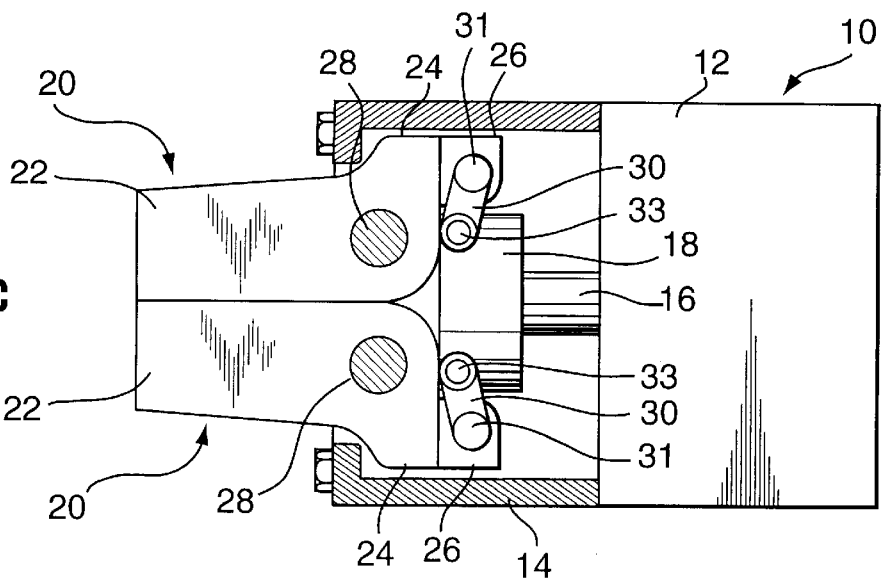
Figure 2:
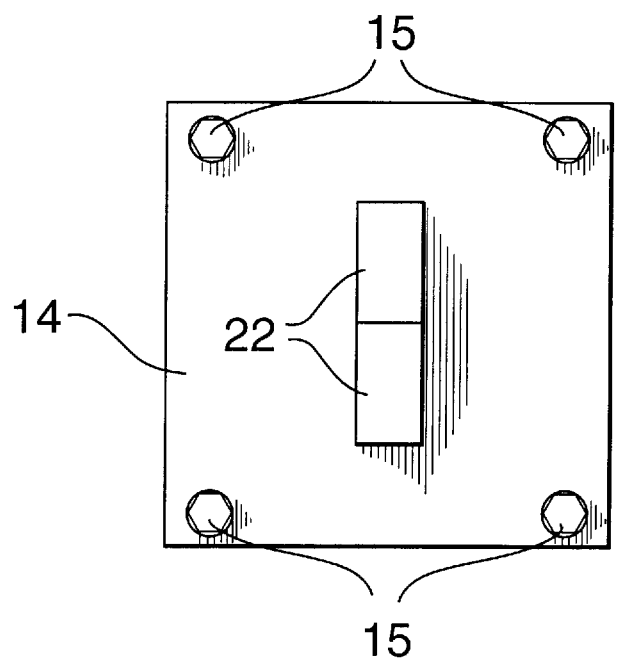

FIGS. 1a, 1b and 1c are side views of the gripper device of the present invention in an open position, in a closed but not locked position, and in a closed and locked position, respectively;

FIG. 2 is top view of the gripper device of FIG. 1b; and

Figure 3:
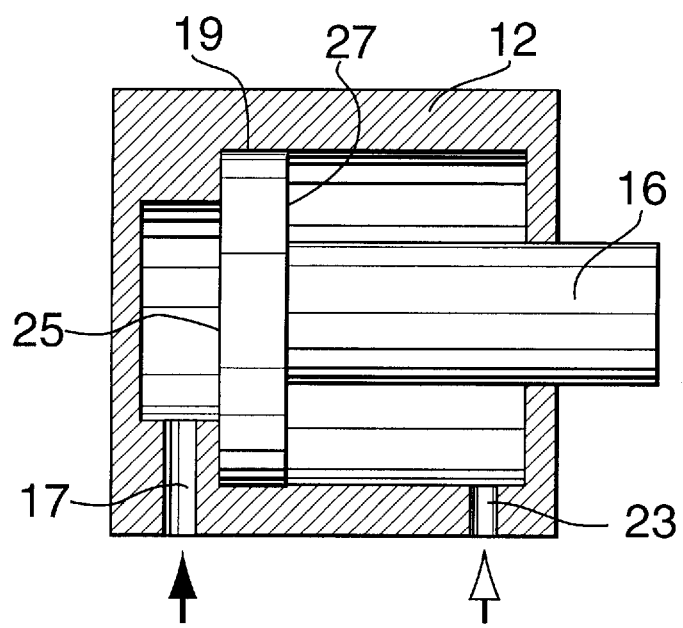

FIG. 3 is a longitudinal, cross-sectional view of a pneumatic cylinder.

DETAILED DESCRIPTION OF THE PREFERRED EMBODIMENTS

As shown in FIGS. 1a–1c, a gripper device, generally designated 10, includes a pneumatic cylinder 12 rigidly mounted to a gripper body or gripper housing 14 by means of socket head cap screws 15 (see FIG. 2) which pass through the gripper body 14 and are threaded into the pneumatic cylinder 12. Within the pneumatic cylinder 12 are means for driving a piston rod 16. In the preferred embodiment, as shown in FIG. 3 (a longitudinal, cross-sectional view of the pneumatic cylinder 12), a piston 19 is driven by compressed air. Compressed air is forced into passageway 17, thereby forcing the piston 19 to the right (as shown in FIG. 3), thereby extending the piston rod 16. To retract the piston rod 16, compressed air is forced into passageway 23 thereby forcing piston 19 to the left, thereby retracting piston rod 16. There are also many other methods for driving a piston using hydraulic or other simple mechanical means.

In the preferred embodiment, a connector block 18 is connected to piston rod 16 by means of a socket head cap screw (not shown) which passes from the connector block 18 and threads into the piston rod 16. The connector block 18 could also be formed integrally with the piston rod 16.

The gripper body 14 encompasses gripper fingers 20. Each gripper finger 20 comprises a finger element 22, a hook portion 24 and a projecting portion 26. The hook portion 24 projects generally perpendicularly from a rear portion of the finger element 22. The projecting portion 26 projects generally rearwardly from near an end portion of the hook portion 24 and the projecting portion 26 is oriented generally parallel to the finger element 22. A pivot pin 28 passes through a curved portion of each gripper finger 20 and the pivot pin 28 is secured, in the preferred embodiment, to the gripper body 14.

With respect to each gripper finger 20, a connecting means, which could, for example, be a mechanical link or chain link 30, connects the projecting portion 26 to the connector block 18. One end of the chain link 30 is pivotally connected by pivot means 31 to the projecting portion 26 and the other end of the chain link 30 is pivotally connected by pivot means 33 to a nearby portion of the connector block 18.

FIGS. 1a and 1c illustrate the gripper device in the open and closed positions, respectively. In the open position shown in FIG. 1a, the piston rod 16 (not visible in FIG. 1a) and connector block 18 are in the retracted position. The chain links 30 and their pivotal connections 31 and 33 are arranged as a toggle. As the gripper fingers 20 move from the open position shown in FIG. 1a to the closed position shown in FIG. 1c, just prior to the fingers 20 achieving the closed and locked position shown in FIG. 1c, the chain links 30 become aligned (see FIG. 1b). When the links 30 become aligned, the toggle force multiplies the actual load by means of a mechanical advantage. In other words, as the links 30 approach alignment, the mechanical advantage approaches infinity. Of course, due to frictional forces and deformations, the mechanical advantage never reaches infinity. As the connector block 18 is further extended, the links 30 move from an aligned arrangement to an over-centre toggle arrangement shown in FIG. 1c. In this position, the fingers 20 are locked in the closed position.

In the preferred embodiment, if the respective parts of the gripper device are of the same dimensions as those shown in FIGS. 1a–1c, a force of approximately 30 psi is required to unlock the fingers 20 (ie: the piston rod 16 and the connector block 18 must be retracted with a force of at least 30 psi to pull the links from an over-centre toggle arrangement, thereby allowing the gripper fingers 20 to open.)

It should be noted that in the closed position shown in FIG. 1c, the fingers 20 are locked in the closed position by two features. The first feature, as noted above, is the over-centre toggle arrangement. The second feature is the general shape and design of the hook portions 24, the projecting portions 26 and the connector block 18. In the closed position, the connector block 18 is shaped to fit within the space created by a rear portion of the gripper fingers 20 and the projecting portions 26, thereby further preventing the gripper fingers 20 from opening until the connector block 18 has been retracted.

It should also be noted that because the gripper fingers 20 close as the piston rod 16 is extended, as opposed to the prior art devices where the fingers close as the piston rod is retracted, approximately 12% more force may be exerted to close the fingers. This additional force is due to the differences in the surface areas acted upon by the compressed air when the piston 19 is being extended and retracted. As shown in the longitudinal, cross-sectional view of pneumatic cylinder of FIG. 3, to extend the piston 19 and piston rod 16, compressed air forced through inlet 17 acts upon surface 25 of piston 19. To retract the piston rod 16, compressed air forced through inlet 23 acts upon surface 27 of piston 19. The surface area of surface 25 is larger than the surface area of surface 27 because a portion of surface 27 is occupied by piston rod 16. Since Force=Pressure×Area and since surface 25 is larger than surface 27, a given pressure against surface 25 will result in a greater force than the same pressure against surface 27.

Numerous modifications and variations of the present invention are possible in light of the above teachings. It is therefore to be understood that within the scope of the appended claims, the invention may be practised otherwise than as specifically described herein. For example, while the gripper fingers 20 in the closed position, as shown in FIG. 1b, abut one another, the fingers 20 could also be spaced, so that in the closed position, there is a gap between the fingers 20 sufficient to grip an object of diameter (or length or width) the same as the gap. If the gripper fingers 20 were provided with such a gap, the connector block 18 would, of course, be shaped appropriately to fit within the space created by the hook portions 24 and the projecting portions 26, as described above.

What is claimed is:

1. A device for gripping objects for use in assembly lines and similar applications, the device comprising:

a housing;

two gripper fingers, wherein in operation the fingers are adapted to move to a closed position to grip an object and an open position to release an object, each gripper finger including a generally forwardly extending finger element, a hook portion projecting generally perpendicularly from near a rear portion of the finger element, and a third portion projecting generally rearwardly from near an end portion of the hook portion wherein the third portion is oriented generally parallel to the finger element and wherein each gripper finger, near a curved portion of the gripper finger, is pivotally connected to said housing;

a piston rod including a connector block at one end said piston rod being movable from a retracted position to an extended position;

a connecting means for attaching the gripper fingers to the connector block;

wherein as the piston rod moves from the retracted position to the extended position, the gripper fingers move from the open position to the closed position; and wherein, when the gripper fingers are in the closed position, the connecting means are adapted to lock the gripper fingers in the closed position until a sufficient force is exerted to move the piston rod towards the retracted position.

2. The device of claim 1 wherein the connecting means comprises two chain link means wherein a first chain link means is pivotally connected at one end to the third portion of one gripper finger and at its other end to said connector block; and a second chain link means being pivotally connected at one end to the third portion of the other gripper finger and at its other end to said connector block.

3. The device of claim 1 wherein, in operation when the piston rod is in the extended position, the connector block is adapted to fit within a space created between the hook portions of the two gripper fingers and the third portions of the two gripper fingers thereby preventing the gripper fingers from opening until the connector block is retracted from the space.

4. The gripper device of claim 1 wherein, in operation when the gripper fingers are in the closed position, said gripper fingers abut one another.

* * * * *